UNITED STATES PATENT OFFICE.

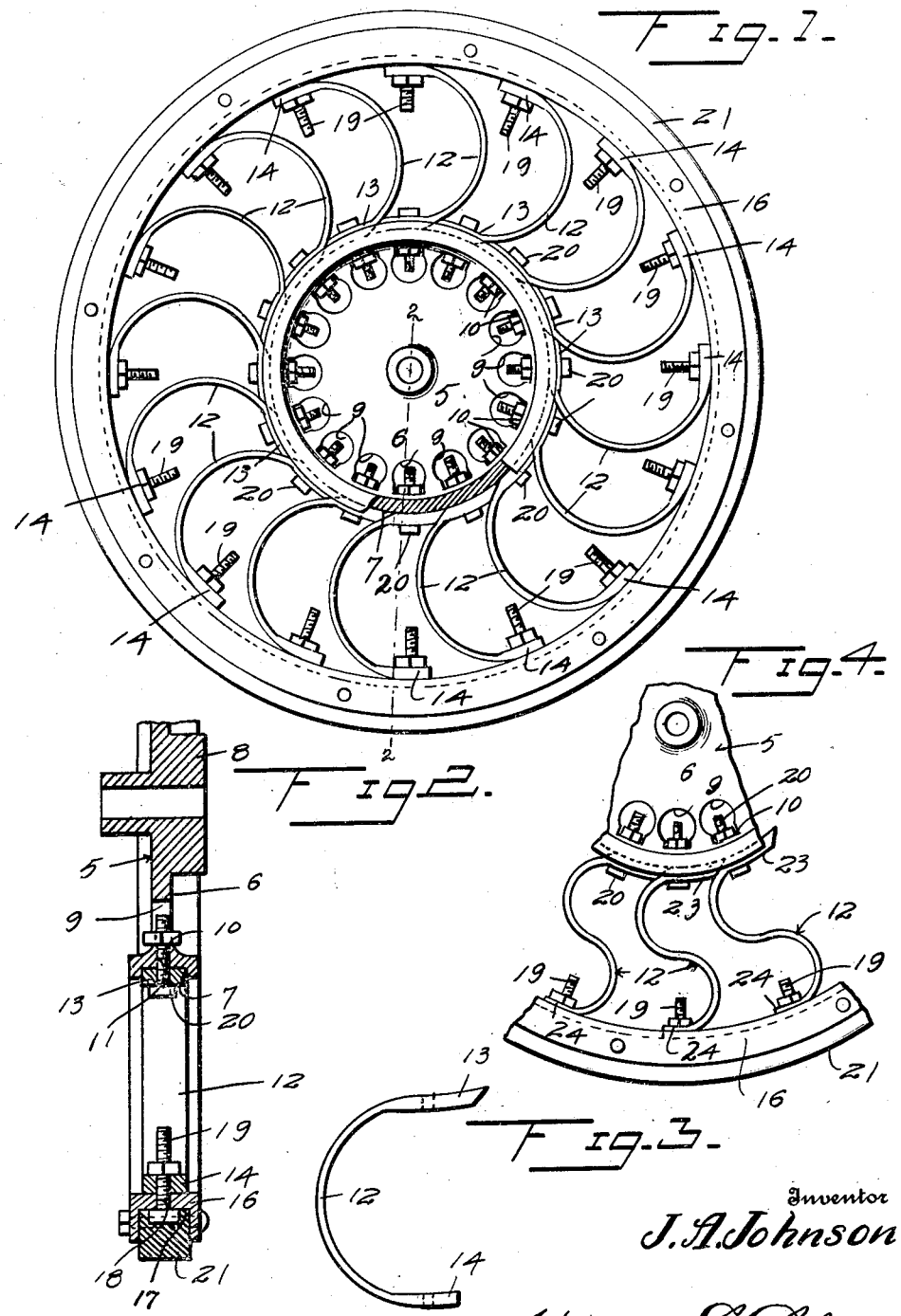

JOHN A. JOHNSON, OF VERONA, WYOMING.

SPRING-WHEEL.

1,369,814.  Specification of Letters Patent.  Patented Mar. 1, 1921.

Application filed May 8, 1920. Serial No. 379,810.

*To all whom it may concern:*

Be it known that I, JOHN A. JOHNSON, a citizen of the United States, residing at Verona, in the county of Sheridan and State of Wyoming, have invented certain new and useful Improvements in Spring-Wheels, of which the following is a specification, reference being had to the accompanying drawings.

This invention relates to spring wheels and has for its object to provide a device of this character which absorbs all of the shocks and jars received in the course of travel before they are transmitted to the axle of the vehicle.

Another object is to provide a device of this character which eliminates the use of pivoted or movable parts so as to prevent wear and at the same time retain the desired resiliency.

Another object is to provide a device of this character including springs having their ends larger or thicker than their intermediate portions, so as to properly sustain the weight applied to the wheel and prevent damage to the springs.

A still further object of the invention is to provide a device of this character wherein the springs can be readily removed and replaced by other springs of different shape and strength according to the form of vehicle to which the wheel is applied.

With these and other objects in view the invention consists in the improved construction and arrangement of parts to be hereinafter more particularly described, fully claimed, and illustrated in the accompanying drawings in which;

Figure 1 is a vertical elevation of a spring wheel constructed in accordance with an embodiment of the invention;

Fig. 2 is a section on the line 2—2 of Fig. 1;

Fig. 3 is a detail view of one of the springs; and

Fig. 4 is a fragmentary and vertical elevation showing a modified form of spring.

Referring to drawings, 5 designates an annular hub member having its marginal edges projecting above each side of the hub and beyond the periphery thereof, to provide an annular recess 6 in each side of the hub and an endless channel 7 in the periphery of the hub. The hub when intended for use on the rear axle, includes a brake drum 8 formed integral with the hub. A series of openings 9 are provided in the sides of the hub member closely adjacent the periphery thereof, the openings extending laterally of the hub. Each opening has the edge thereof adjacent the periphery of the hub formed into a recess 10 while extending through the end wall of the recess 10 from the channel 7 is an opening 11. By this means, each of the openings 9 communicate with the channel 7 in the periphery of the hub.

In order to absorb all shocks and jars received by the wheel, a plurality of springs 12 are provided, the springs being semi-cicular in form so that the compression of the lower springs will cause the expansion of the upper springs of the wheel and thereby equalize the strain and absorb the shock. The ends of the spring are thicker than the intermediate portion thereof to provide feet 13 and 14, the spring tapering from the feet upwardly toward the intermediate portion in angular relation to each foot. The foot 13 is longer than the foot 14 and has its end beveled to engage the rear portion of the adjacent foot 13 when the springs are disposed in the channel 7. By this means, the portion of the spring receiving the most strain is firmly braced to prevent breaking and as the spring is constructed in this form, its resiliency is not interfered with as would be the case if the ends of the springs were bent under. It will also be noted that the foot 13 of each spring conforms to the contour of the periphery of the hub and lies flush with the marginal edges thereof in addition to bracing the preceding foot 13, thereby eliminating danger of twisting or side movement of the spring.

A felly or rim 16 is provided, the rim having its marginal edges extended outwardly in parallel relation to each other to provide a channel 17. A series of openings 18 are provided in the rim and are disposed substantially in alinement with the openings 11 in the periphery of the hub. The foot 14 of each spring is intended to engage the inner surface of the rim and adapted to receive securing means such as bolts 19 passed through the rim and foot. Securing means such as bolts 20 are also intended to be passed through each of the feet 13 of the spring and the adjacent opening 11 and opening 9, the nut of the bolt being disposed in the opening 9 so as to permit the bolt to be quickly tightened. In order to firmly secure the foot 13 to the hub, the nut of the bolt is positioned in the recess 10 of the opening 9 to prevent turning of the nut. The bolt is then tightened which firmly clamps the foot 13 in the channel 7, the nut being locked so that the possibility of it becoming loose through vibration is eliminated.

A tire 21 either of solid rubber or steel is intended to be disposed in the channel 17. Bolts 22 are passed through openings in the flanges of the rim 16, the bolt drawing the longer flange inwardly in binding engagement to the tire so that slipping or disengagement is impossible.

In Fig. 4 a modified form of spring is shown. This spring is S-shaped and has its ends 23 and 24 constructed similar to the ends 13 and 14 of the preferred form of spring. By this means the strength of the spring is increased so that if the wheel is used on trucks or like heavy vehicles the semi-circular form of spring can be replaced by the S-shaped form of spring, as the S-shaped form of spring offers more resistance and is therefore suitable for heavy loads.

From the foregoing it will be readily seen that this invention provides a novel form of spring wheel which in view of its construction can be manufactured for a small amount and as it contains no movable parts such as pivots it will last indefinitely, the danger of the spring breaking being overcome by the particular construction of its ends. Furthermore, the novel method of connecting the end 13 to the hub eliminates threading the openings 9. This not only saves time in applying the springs but permits conventional fastening means to be used and so positioned that they are not affected by vibration so that it is not possible for the springs to become accidentally disengaged. The formation of the hub also permits the brake drum to be incorporated therein, the marginal flanges and sides of the hub being so arranged that they do not interfere with the operation of the drum.

What is claimed is:—

A resilient wheel comprising a rim and a hub, a plurality of springs disposed between the rim and the hub, said hub having a series of key-hole slots adjacent its periphery, a plurality of openings in said periphery communicating with the rectangular portion of said key-hole slot, bolts extending through one end of each spring for securing said end to the periphery of the hub, the head of said bolt being disposed in engagement with the end of the spring, the shank of said bolt extending through the opening in the periphery and into the key-hole slot, and a nut threaded on the shank of the bolt within the circular portion of the key-hole slot, said nut being drawn into the rectangular portion of said key-hole slot by the bolt.

In testimony whereof I hereunto affix my signature.

JOHN A. JOHNSON.